(12) United States Patent
Pursifull

(10) Patent No.: US 8,297,263 B2
(45) Date of Patent: *Oct. 30, 2012

(54) VACUUM SUPPLY SYSTEM

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/167,996

(22) Filed: Jun. 24, 2011

(65) Prior Publication Data

US 2011/0247594 A1    Oct. 13, 2011

Related U.S. Application Data

(63) Continuation of application No. 12/717,033, filed on Mar. 3, 2010, now Pat. No. 7,966,996.

(51) Int. Cl.
*F02M 33/04* (2006.01)

(52) U.S. Cl. ............ 123/518; 123/519; 123/198 C; 60/397

(58) Field of Classification Search ............ 123/198 C, 123/518, 519; 60/397
See application file for complete search history.

(56) References Cited

U.S. PATENT DOCUMENTS

| | | | |
|---|---|---|---|
| 4,014,410 A | 3/1977 | Bryant | |
| 4,016,837 A | 4/1977 | Wentworth, Jr. | |
| 4,328,669 A | 5/1982 | Mort | |
| 4,783,962 A | 11/1988 | Grein | |
| 5,273,020 A | 12/1993 | Hayami | |
| 5,390,645 A | 2/1995 | Cook et al. | |
| 5,557,930 A | 9/1996 | Cakmaz et al. | |
| 5,961,189 A | 10/1999 | Lutteke et al. | |
| 5,970,957 A | 10/1999 | Fried et al. | |
| 6,014,958 A | 1/2000 | Miwa et al. | |
| 6,412,277 B2 | 7/2002 | Hagen et al. | |
| 6,425,356 B1 | 7/2002 | Pischinger et al. | |
| 7,784,449 B2 | 8/2010 | Maly | |
| 8,109,259 B2 * | 2/2012 | Ulrey et al. | 123/572 |
| 2003/0192365 A1 | 10/2003 | Perry et al. | |
| 2006/0196482 A1 | 9/2006 | Kakimoto et al. | |
| 2007/0063579 A1 | 3/2007 | Carlsson | |
| 2008/0302100 A1 | 12/2008 | Ohtani et al. | |
| 2009/0044785 A1 | 2/2009 | Maly | |
| 2011/0290203 A1 * | 12/2011 | Pursifull | 123/41.08 |

OTHER PUBLICATIONS

Pursifull, Ross Dykstra, "Airflow Generating Device for Alternator Cooling and Vapor Canister Purging," U.S. Appl. No. 12/814,167, Record ID 83151414, filed Jun. 11, 2010, 28 pages.

* cited by examiner

*Primary Examiner* — Erick Solis
(74) *Attorney, Agent, or Firm* — Julia Voutyras; Alleman Hall McCoy Russell & Tuttle LLP

(57) ABSTRACT

A method of operating a boosted engine system is described in which an ejector coupled with a fuel vapor purging system can generate vacuum during both purging and non-purging conditions, and during both boosted and non-boosted conditions. The vacuum can therefore be used to power vacuum actuated brakes, and/or other vacuum actuators, irrespective of the purging conditions, and irrespective of boost levels.

19 Claims, 4 Drawing Sheets

VACUUM SUPPLY SYSTEM

CROSS REFERENCE TO RELATED APPLICATIONS

The present application is a continuation of U.S. patent application Ser. No. 12/717,033 filed Mar. 3, 2010, the entire contents of which are incorporated herein by reference.

FIELD

The present description relates to methods and systems for providing a vacuum for various actuators, including a power brake and a fuel vapor recovery system, in a vehicle with a boosted internal combustion engine.

BACKGROUND/SUMMARY

Vehicles may be fitted with emission control systems wherein vaporized hydrocarbons (HCs) released from a fuel tank (for example, during refueling) are captured and stored in a fuel vapor canister packed with an adsorbent. At a later time, when the engine is in operation, the evaporative emission control system may use a vacuum (or pressure) to purge the vapors into the engine intake manifold for use as fuel. The purge flow vacuum (or pressure) may be generated by one or more pumps and/or ejectors.

One example approach for providing sufficient vacuum for a fuel purge flow is illustrated by Kakimoto et al. in US 2006/0196482 A1. Herein, blow-by gas and purge gas are delivered to the engine intake together. Specifically, blow-by gas is pumped to the engine intake through an ejector in such a manner that a fuel vapor purge flow is also sucked into the intake by using a negative pressure (that is, vacuum) generated by the high-speed flow of the blow-by gas through the ejector.

However, the inventors herein have recognized potential issues with such an approach. In one example, pump operation is necessitated for generating a vacuum at the ejector and for drawing a purge flow, irrespective of whether the engine is boosted or not. Thus, due to dependence on pump operation for purging, during conditions where pump operation is limited or restricted, a purge flow may not be possible. Additionally, the need for constant pump operation during purging may add to fuel costs while decreasing pump life. In another example, a flow of blow-by gases is necessitated for generating the vacuum at the ejector and for drawing the purge flow. Thus, during purging conditions when a flow of blow-by gases to the intake is not desired, or not available, a purging operation may not be performed. In still another example, the vacuum generated at the ejector may only be used for drawing a purge flow. Thus, an alternate vacuum actuator, such as a power brake, may not be operated using the ejector vacuum during a purging operation. Thus, an additional pump and/or ejector may be required to generate the vacuum required for the power brake. As such, this may increase component cost.

Thus, in one example, some of the above issues may be addressed by a method of operating a boosted engine system including a fuel vapor canister, a purge pump, and an ejector. In one embodiment, the method may comprise pumping a purge flow through the fuel vapor canister, then through the ejector, and then to an engine intake, and applying vacuum from the ejector to a vacuum actuator.

For example, a purge pump and at least one ejector may be configured in series and may be coupled between an engine intake manifold and a fuel vapor recovery system such that, during a boosted engine operation, a flow of air and/or fuel vapors may be pumped to the engine intake through the ejector, thereby creating a vacuum at the ejector. In one example, during purging conditions, a canister vent valve may be opened and the purge pump may be operated to pump a fuel vapor purge flow through the fuel vapor canister, then through the ejector, and then to the engine intake. By pumping a purge flow through the ejector before delivery of the purge flow to the engine intake, a vacuum may be advantageously generated at the ejector during boosted engine operation. This vacuum may be applied from the ejector to a vacuum actuator, such as a power brake and/or a wastegate actuator. As such, additional secondary ejectors may be coupled to the primary ejector to further deepen the generated vacuum. In this way, during purging conditions, a purge pump may be operated to provide a vacuum for drawing fuel vapors and also for actuating a vacuum actuator.

In another example, during a non-purging condition, the canister vent valve may be closed, a vapor bypass valve may be opened, and the purge pump may be operated to bypass the fuel vapor canister and pump air (e.g., fresh air not mixed with fuel vapors) through the ejector to the engine intake. The vacuum generated by the pumping of air through the ejector, may be applied from the ejector to the vacuum actuator. In this way, during non-purging conditions, the purge pump may be operated to provide a vacuum for various vacuum actuators. In comparison, when the engine is not boosted, the intake manifold vacuum may be applied to draw a purge flow from the fuel vapor recovery system during purging conditions, without operating the purge pump. Similarly, during purging and non-purging conditions, intake manifold vacuum may be applied for vacuum actuator actuation.

In alternate examples, the pump may be located upstream or downstream of the fuel vapor storage canister. In either pump configuration, the ejector may be located with its exit flowing towards a low pressure.

In this way, a purge flow may be drawn to an engine intake, in the presence or absence of engine boost, without requiring constant purge pump operation. Further, the purging operation may be performed independent of a blow-by gas flow. Specifically, in the absence of boost, an engine intake manifold negative pressure may be used to draw a purge flow, while a purge pump may be used to draw a purge flow in the presence of boost. Additionally, a vacuum may be drawn at the ejector coupled downstream of the pump during every purging operation. Specifically, by pumping the purge flow through an ejector before delivering purged fuel vapors to the engine intake, a vacuum may be generated at the ejector during boosted conditions, which may be advantageously used for actuating additional vacuum actuators. Consequently, the need for dedicated vacuum pumps for the vacuum actuators may be reduced. Alternatively, the purge flow driven vacuum may be used in addition to a dedicated vacuum pump, enabling the use of a smaller vacuum pump for the vacuum actuator and/or a shorter duration of vacuum pump operation. By enabling purging and vacuum actuation under most engine operating conditions, vehicle fuel economy and emissions may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
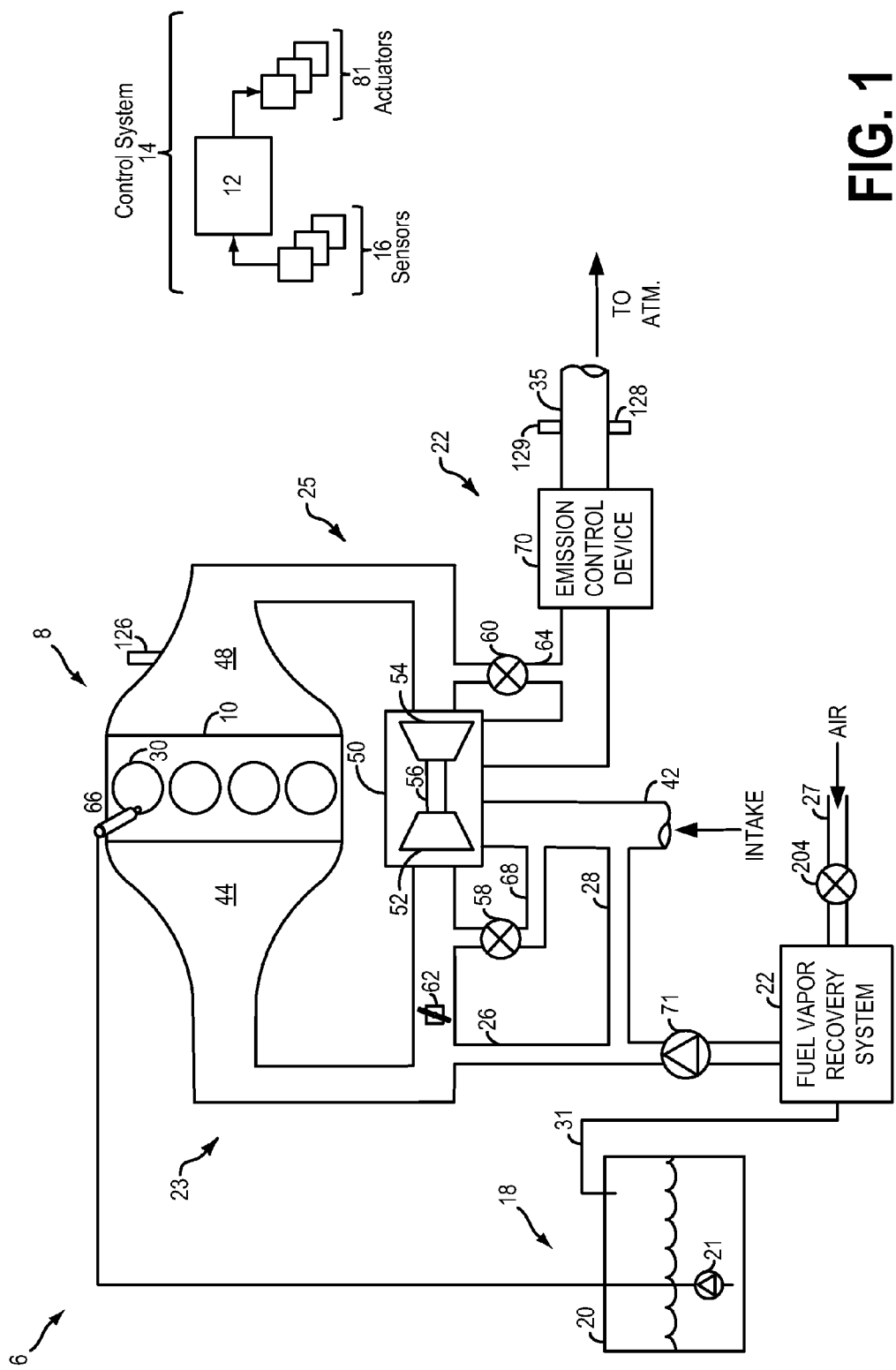
FIG. 1 shows a schematic depiction of an engine and an associated fuel vapor recovery system.
Figure 2:
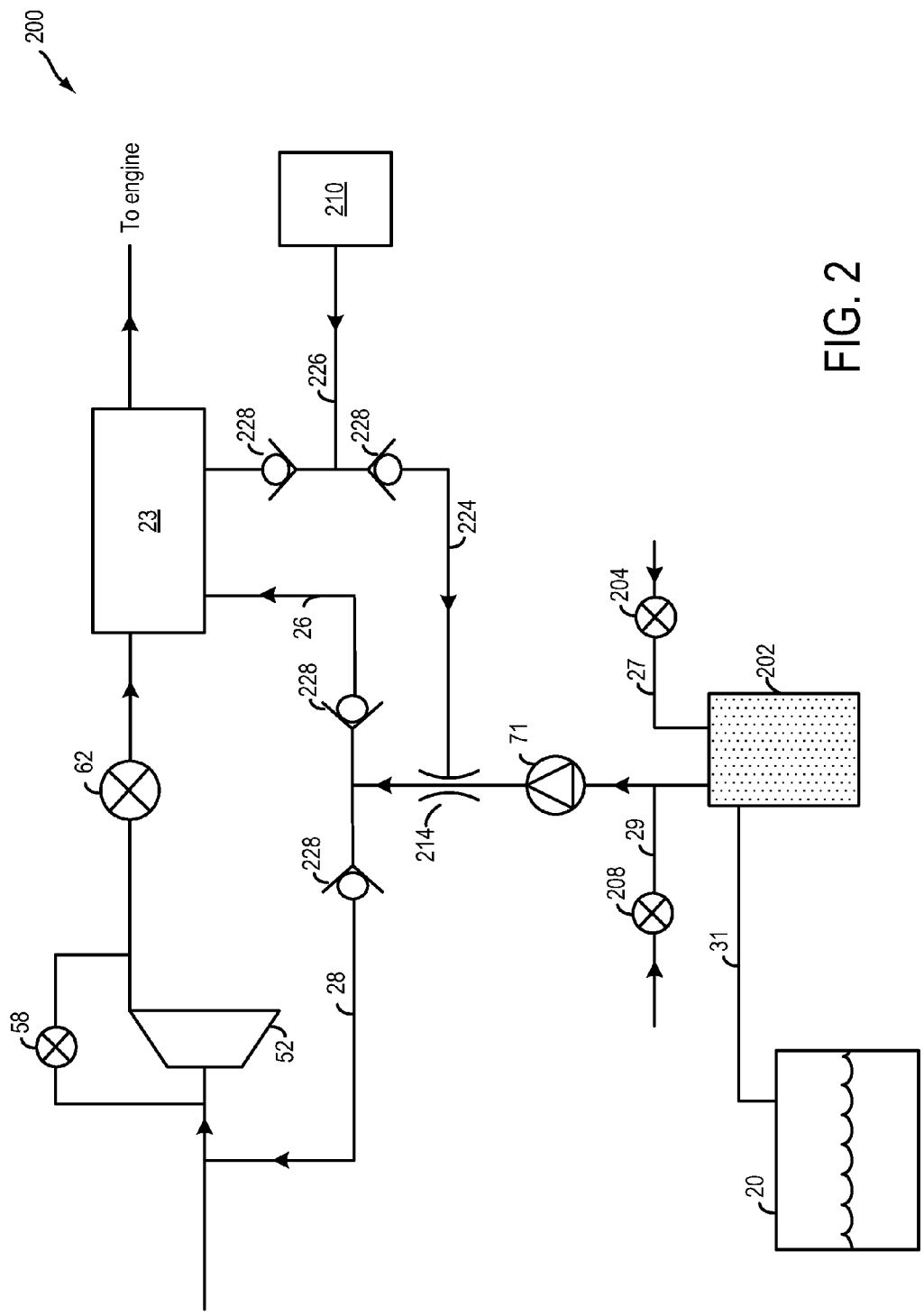
FIGS. 2-3 show example embodiments of the fuel vapor recovery system of FIG. 1.
Figure 3:
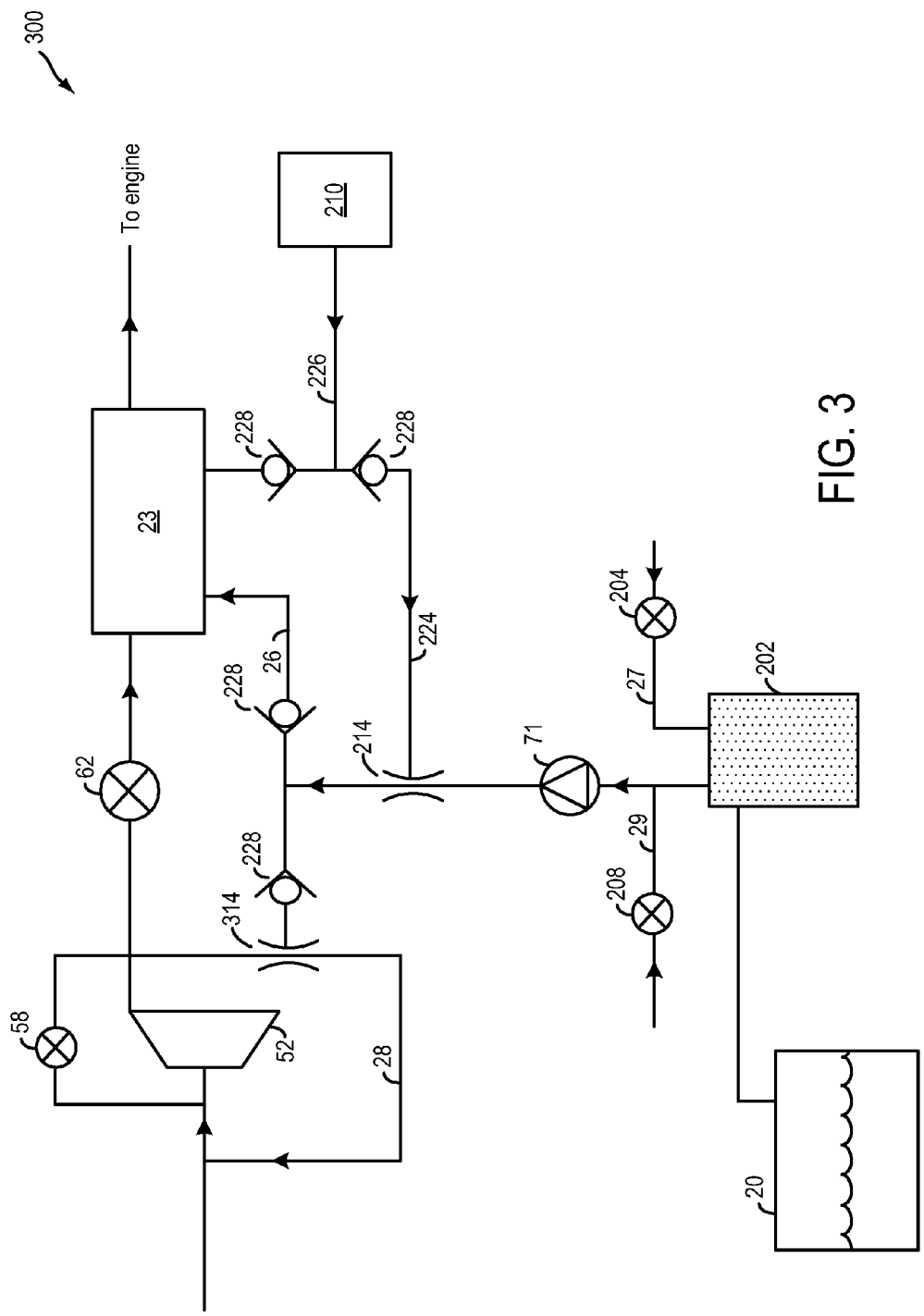
Figure 4:
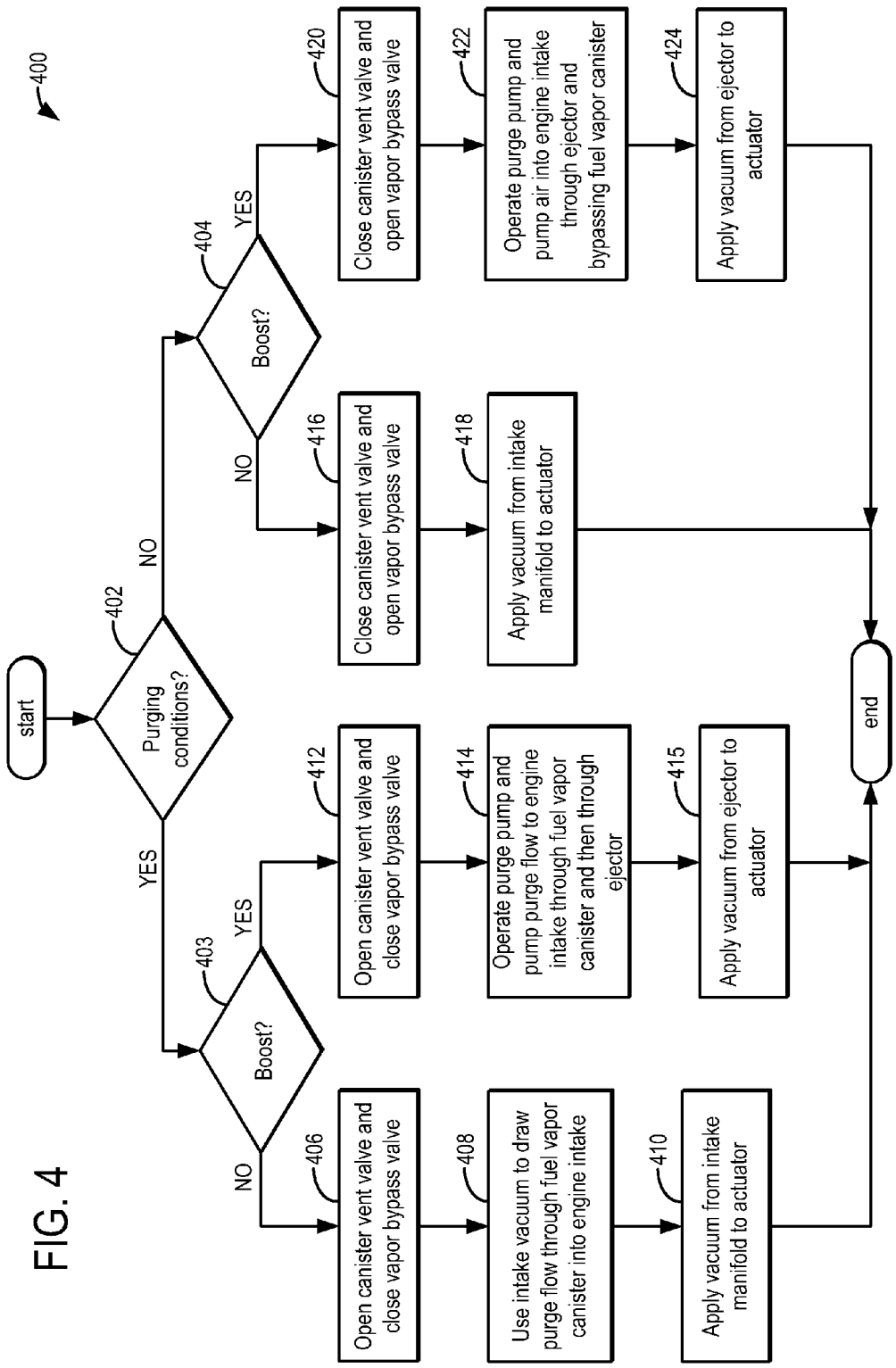
FIG. 4 shows a high level flow chart illustrating a routine that may be implemented for purging a fuel vapor canister, and for generating a vacuum at the ejector of FIG. 1, during purging and non-purging conditions, in the presence or absence of engine boost.

The following description relates to systems and methods for generating an ejector generated vacuum using purge pump flow during fuel vapor canister purging and non-purging conditions. As shown in FIGS. 1-3, a purge pump may be coupled to a fuel vapor canister of a fuel vapor recovery system to pump a purge flow through a fuel vapor canister into a boosted engine intake manifold. One or more ejectors may be coupled to the pump and the purge flow may be pumped through the canister, through the ejector(s), and to the engine intake. As such, the pumping of the purge flow through the ejector may provide a negative pressure at the ejector which may be applied from the ejector to a vacuum actuator (such as, a power brake and/or a wastegate actuator). A controller may be configured to perform routines, such as depicted in FIG. 4, to operate a purge pump in the presence of engine boost to generate a vacuum at the ejector. By pumping a purge flow through the ejector during purging conditions, vacuum actuation may be enabled during purging conditions. By pumping an air flow through the ejector, while bypassing the fuel vapor canister during non-purging conditions, vacuum actuation may be enabled during non-purging conditions. In the absence of engine boost, the negative pressure of the intake manifold may be advantageously used to draw a purge flow and for vacuum actuation. In this way, vacuum actuation may be enabled during purging and non-purging conditions without operating a dedicated vacuum pump. Furthermore, purging may be performed without constantly operating a purge pump. By using a common pump for both a purge flow and vacuum actuation, component reduction benefits may be achieved.

FIG. 1 shows a schematic depiction of a vehicle system 6. The vehicle system 6 includes an engine system 8 coupled to a fuel vapor recovery system 22 and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the vehicle system, such as a variety of valves and sensors, as further elaborated in the example embodiments of FIGS. 2-3.

Throttle 62 may be located in intake passage 42 downstream of a boosting device, such as turbocharger 50, or a supercharger. Turbocharger 50 may include a compressor 52, arranged between intake passage 42 and intake manifold 44. Compressor 52 may be at least partially powered by exhaust turbine 54, arranged between exhaust manifold 48 and exhaust passage 35. Compressor 52 may be coupled to exhaust turbine 54 via shaft 56. Compressor 52 may be configured to draw in intake air at atmospheric air pressure and boost it to a higher pressure. Using the boosted intake air, a boosted engine operation may be performed.

An amount of boost may be controlled, at least in part, by controlling an amount of exhaust gas directed through exhaust turbine 54. In one example, when a larger amount of boost is requested, a larger amount of exhaust gases may be directed through the turbine. Alternatively, for example when a smaller amount of boost is requested, some or all of the exhaust gas may bypass turbine 54 via turbine bypass passage 64, as controlled by wastegate 60. The position of wastegate 60 may be controlled by a wastegate actuator (not shown) as directed by controller 12. In one example, the wastegate actuator may be a vacuum-driven solenoid valve. As further elaborated in FIGS. 2-4, the wastegate actuator may be actuated by vacuum applied from an ejector coupled to fuel vapor recovery system 22. The vacuum may be generated at the ejector in response to a purge flow pumped through the ejector during purging conditions, and/or an air flow pumped through the ejector during non-purging conditions.

An amount of boost may additionally or optionally be controlled by controlling an amount of intake air directed through compressor 52. Controller 12 may adjust an amount of intake air that is drawn through compressor 52 by adjusting the position of compressor bypass valve 58 in compressor bypass passage 68. In one example, when a larger amount of boost is requested, a smaller amount of intake air may be directed through the compressor bypass passage.

Fuel system 18 may include a fuel tank 20 coupled to a fuel pump system 21. The fuel pump system 21 may include one or more pumps for pressurizing fuel delivered to fuel injectors 66 of engine 10. While only a single fuel injector 66 is shown, additional injectors are provided for each cylinder. It will be appreciated that fuel system 18 may be a return-less fuel system, a return fuel system, or various other types of fuel system. A fuel pump may be configured to draw the tank's liquid from the tank bottom. Vapors generated in fuel system 18 may be routed to a fuel vapor recovery system 22, described further below, via conduit 31, before being purged to the engine intake 23. As further elaborated in FIG. 2, during a purging condition, air may be drawn in through the fuel vapor recovery system through vent 27 and canister vent valve 204. Fuel tank vapors may be vented through the tank top. The fuel tank 20 may hold a plurality of fuels, including fuel blends.

Fuel vapors stored in fuel vapor recovery system may be purged to engine intake 23 during purging conditions. Specifically, a purge flow may be driven by purge pump 71, and may be directed to the engine intake post-throttle, along first conduit 26, and/or into the pre-compressor engine air inlet, along second conduit 28. As such, second conduit 28 is atypical of production designs. By driving a purge flow to the engine intake through an ejector (shown in FIGS. 2-3) coupled, in series, downstream of the purge pump, a vacuum may be created at the ejector. The ejector may be operationally coupled to one or more vacuum actuators, such as a power brake and/or a wastegate actuator. By creating a vacuum at the ejector by driving the purge flow through the ejector, vacuum necessary for operating the vacuum actuators may be generated while reducing the need for a dedicated vacuum pump.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), temperature sensor 128 and pressure sensor 129 (located downstream of emission control device 70). Other sensors such as additional pressure, temperature, air/fuel ratio, and composition sensors may be coupled to various locations in the vehicle system 6. As another example, actuators 81 may include fuel injectors 66, throttle 62, compressor 52, purge pump 71, a fuel pump of pump system 21, wastegate 60, wastegate actuators, compressor bypass valve 58, etc. The control system 14 may include an electronic controller 12. The controller may receive input data from the various sensors, process the input data, and trigger the actuators in response to the processed input data based on instruction or code programmed therein corresponding to one or more routines. An example control routine is described herein with reference to FIG. 4.

FIGS. 2-3 depict example embodiments of the fuel vapor recovery system of FIG. 1. As elaborated herein, during purging conditions, a controller may operate a purge pump of the fuel vapor recovery system to drive a purge flow through a fuel vapor canister, and through an ejector, and then purge the stored fuel vapors in a boosted engine intake. By driving the purge flow to the engine intake through the ejector, a vacuum may be created at the ejector, which may be applied to a vacuum actuator, thereby reducing the need for a dedicated vacuum pump for the actuator.

As depicted in FIG. 2, embodiment 200 of fuel vapor recovery system 22 includes a fuel vapor retaining device, depicted herein as fuel vapor canister 202. Canister 202 may be filled with an adsorbent capable of binding large quantities of vaporized HCs. In one example, the adsorbent used is activated charcoal. Canister 202 may receive fuel vapors from fuel tank 20 through conduit 31. While the depicted example shows a single canister, it will be appreciated that in alternate embodiments, a plurality of such canisters may be connected together. Canister 202 may communicate with the atmosphere through vent 27. Canister vent valve 204 may be located along vent 27, coupled between the fuel vapor canister and the atmosphere, and may adjust a flow of air and vapors between canister 202 and the atmosphere. In one example, operation of canister vent valve 204 may be regulated by a canister vent solenoid (not shown). For example, based on whether the canister is to be purged or not, the canister vent valve may be opened or closed.

Purge pump 71 may be configured to pump a purge flow through fuel vapor canister 202 on to engine intake 23. In one example, purge pump 71 may be an electric pump driven by an electric motor. In alternate embodiments, purge pump 71 may be engine-driven or may share a shaft with a fuel pump. Purge pump 71 may be, for example, a positive displacement pump, or a centrifugal (axial, mixed, or radial) pump. In an alternate embodiment, purge pump 71 may be located along vent 27. However, in this embodiment, the functionality of valve 208 may be lost.

One or more ejectors may be positioned downstream of the purge pump. For example, a first ejector 214 may be coupled downstream of, and in series with, purge pump 71. During purging conditions, purge pump 71 may pump the purge flow through fuel vapor canister 202, then through ejector 214, and then to engine intake 23. An engine controller may be configured to open canister vent valve 204 to enable purge pump 71 to draw air mixed with fuel vapors through the canister and then through first ejector 214. As such, the pump-driven purge flow through the ejector may generate a vacuum therein. First ejector 214 may be coupled to vacuum actuator 210 along vacuum line 226 and conduit 224. In one example, the vacuum actuator may include a power brake. In another example, the vacuum actuator may include a wastegate actuator. The generated vacuum may be applied from first ejector 214 to vacuum actuator 210 during actuator operation (such as during power brake application, or during wastegate actuation), thereby reducing the need for operating a dedicated vacuum pump.

During non-purging conditions, purge pump 71 may be configured to pump an air flow (that is, air not mixed with fuel vapors), while bypassing fuel vapor canister 202, through ejector 214. Specifically, an engine controller may close canister vent valve 204, and open vapor bypass valve 208 to enable purge pump 71 to draw fresh air through conduit 29, through first ejector 214, and then pump the air flow to the engine intake. The pump-driven flow of air through the ejector during non-purging conditions may generate a vacuum in the ejector that may be applied from the ejector to the vacuum actuator 210 during actuator operation. In this way, by operating a purge pump, a vacuum may be generated at ejector during purging and non-purging conditions.

The purge flow driven by purge pump 71 during purging conditions, and/or the air flow driven by the purge pump during non-purging conditions, may be directed to engine intake 23 through at least one of a first conduit 26 and a second conduit 28. Specifically, air and/or fuel vapors may be directed to engine intake 23 downstream of intake throttle 62 along first conduit 26, and/or to an engine air inlet upstream of compressor 52 along second conduit 28. One or more check valves 228 may be included in the fuel vapor recovery system to regulate the flow of vapors and prevent the intake manifold pressure from flowing gases in the opposite direction of the purge flow. For example, check valves 228 may be included in first conduit 26, second conduit 28, vacuum line 226, and conduit 224. Check valves 228 also passively insure that the ejector exhausts to the lowest pressure node.

FIG. 3 shows an alternate embodiment 300 of the fuel vapor recovery system. Herein, the one or more ejectors include a first ejector 214 coupled to (first) vacuum actuator 210, positioned downstream of purge pump 71, and a second ejector 314, coupled to first ejector 214, and further coupled to the (first) vacuum actuator 210, positioned downstream of purge pump 71 and upstream of compressor 52, along second conduit 28. In one example, second conduit 28 may be controlled with a solenoid valve or other valve type to improve turbocharger spin-up. In this way, second ejector 314 may be included to further deepen engine vacuum. In an alternate embodiment, first ejector 214 may be coupled to a first vacuum actuator while second ejector 314 may be coupled to a second actuator.

It will be appreciated that while the embodiments of FIGS. 2-3 illustrate a dual path system (into the engine intake manifold and the engine air inlet), in alternate embodiments, a purge flow may be directed to the engine intake along a single path system, into either the engine intake manifold or the engine air inlet. It will also be appreciated that while the depicted embodiments illustrate purge pump 71 positioned to enable a drawing of air and fuel vapors through the canister, purge pump 71 may alternatively be positioned to push air through the canister (for example, to clean the canister). Similarly, while the depicted embodiments show ejectors 214, 314 positioned downstream of purge pump 71, in alternate embodiments, one or more of the ejectors may be positioned upstream of purge pump 71, or anywhere in the flow created by purge pump 71. However, the ejector may have peak vacuum generation when exhausting to the lowest pressure node.

Additionally, in some embodiments, a canister purge valve may be included in-line with the outlet of canister 202, for example, between canister 202 and purge pump 71. Alternatively, a canister purge valve may be located in vacuum line 226. As such, the canister purge valve may be a continuous device that meters purge flow to the engine. Additionally, the canister purge valve may enable a purge flow into the engine intake to be sufficiently lowered. However, in embodiments where purge pump 71 is a variable speed (or flow or displacement) positive displacement pump, the canister purge valve may not be required as the metering function of the purge valve may be taken over by the purge pump. In embodiments where a purge pump technology is used that allows flow through the pump when the pump is off, a canister purge valve may be required to meter fuel vapor into the engine.

Now turning to FIG. 4, an example routine 400 is described for generating a vacuum at the ejector(s) of FIGS. 2-3 during purging and non-purging conditions, in the presence or absence of engine boost. Specifically, the routine enables intake manifold vacuum to be applied for drawing a purge flow and/or vacuum actuator actuation, in the absence of boost, and enables a purge pump to be operated in the presence of engine boost for drawing a purge flow and generating a vacuum at the ejector(s) for vacuum actuator actuation.

At 402, purging conditions may be confirmed. Purging conditions may be confirmed based on various engine and vehicle operating parameters, including an amount of hydrocarbons stored in canister 202 being greater than a threshold, the temperature of emission control device 70 being greater than a threshold, a temperature of canister 202, fuel temperature, the number of engine starts since the last purge operation (such as the number of starts being greater than a threshold), a duration elapsed since the last purge operation, fuel properties, and various others. If purging conditions are confirmed, then at 404, a controller may open canister vent valve 204 (for example, by energizing a canister vent solenoid) while closing vapor bypass valve 208.

If purging conditions are confirmed, then at 403, it may be determined whether a boost is present or not. As such, a boost condition may be confirmed when a manifold intake pressure is higher than an atmospheric pressure. If an engine boost is not present, then at 406, an engine controller may open the canister vent valve and close the vapor bypass valve. At 408, the engine intake manifold vacuum may be used to draw a purge flow through the fuel vapor canister into the engine intake. In this way, stored fuel vapors may be purged to the engine intake in the absence of engine boost without operating a purge pump. At 410, the engine intake manifold vacuum may be applied to one or more vacuum actuators, such as a power brake. In this way, vacuum actuation may be enabled during purging conditions, in the absence of engine boost, without operating a dedicated vacuum pump. Thus, in the absence of boost, an engine controller may apply vacuum from the engine intake to the fuel vapor canister and/or the vacuum actuator.

If an engine boost is present at 403, then at 412, an engine controller may open the canister vent valve and close the vapor bypass valve. At 414, in the presence of boost, the purge pump may be operated to pump a purge flow through the fuel vapor canister, through the one or more ejectors, on to the engine intake. At least some of the pumped purge flow may be delivered to the engine intake downstream of an intake throttle and/or at least some of the pumped purge flow may be delivered to the engine intake upstream of a compressor. In this way, stored fuel vapors may be purged to the engine intake in the presence of engine boost. Furthermore, the pumping of purge flow through the ejector may be advantageously used to generate a vacuum at the ejector. At 415, the controller may apply the resultant vacuum from the one or more ejectors to one or more vacuum actuators, such as a wastegate actuator. In this way, vacuum actuation may be enabled while purging, in the presence of engine boost, without operating a dedicated vacuum pump.

If purging conditions are not confirmed at 402, then at 404, it may be determined whether a boost is present or not. If an engine boost is not present at 404, then at 416, an engine controller may close the canister vent valve and open the vapor bypass valve. At 418, the engine intake manifold vacuum may be applied on one or more vacuum actuators, such as a power brake. In this way, vacuum actuation may be enabled during non-purging conditions, in the absence of engine boost, without operating a dedicated vacuum pump. If an engine boost is present at 404, then at 420, an engine controller may close the canister vent valve and open the vapor bypass valve. At 422, the purge pump may be operated to pump an air flow (that is, fresh air not mixed with fuel vapors) through the one or more ejectors, and then into the engine intake, while bypassing the fuel vapor canister. At least some of the pumped air flow may be delivered to the engine intake downstream of an intake throttle and/or at least some of the pumped air flow may be delivered to the engine intake upstream of a compressor. In this way, the flow of air through the ejector may be used to generate a vacuum at the ejector. At 424 the generated vacuum may be applied from the ejector to one or more vacuum actuators, such as a wastegate actuator. In this way, vacuum actuation may be enabled when not purging, in the presence of engine boost, without operating a dedicated vacuum pump.

Additionally, a fuel injection to the engine may be adjusted during a transition between purging and non-purging conditions. The adjustment may include, for example, adjusting fuel injection responsive to the purge flow during purging conditions, and adjusting fuel injection responsive to the air flow during non-purging conditions. In one example, during a boosted purging condition, as the purge pump is operated to drive a purge flow through the canister and the ejector to the engine intake manifold, a fuel injection may be adjusted to a first, lower amount based on an amount of fuel vapors being recycled to the engine intake in purge flow. The amount of fuel vapors may be estimated based on, for example, an air-fuel ratio sensor, a pressure difference in the fuel canister before and after purging, input received during a preceding fuel vapor canister storing operation, etc. In another example, during a boosted non-purging condition, as the purge pump is operated to drive an air flow through the ejector, and bypassing the canister, to the engine intake manifold, a fuel injection may be adjusted to a second, higher amount responsive to the air flow, and taking into consideration that no fuel vapors are being recycled to the engine intake. The air flow may be estimated based on, for example, pump speed, pump efficiency, etc. In this way, during a transition between purging and non-purging conditions, the fuel injection may be adjusted to compensate for the presence or absence of fuel vapors in the flow directed to the engine intake. By reducing an amount of fuel injection based on an amount of fuel vapors in the purge flow, engine efficiency during the transition can be improved.

In this way, fuel vapors stored in a fuel vapor retaining device may be purged in the presence or absence of engine boost. By enabling purging during a wider range of engine operating conditions, fuel vapor recovery may be improved. By pumping a purge flow through an ejector, a vacuum may be generated that may be used for the actuation of one or more vacuum actuators. By using a purge pump for purging operations and for generating vacuum for vacuum actuation, the need for additional vacuum pumps may be reduced, thereby providing reduced component benefits.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and nonobvious combinations and subcombinations of the various systems and configurations, and other features, functions, and/or properties disclosed herein.

The invention claimed is:

1. A method of operating a boosted engine system, comprising,
pumping a purge flow through a fuel vapor canister and an ejector, and into an engine intake via a purge pump when boost is present;
drawing the purge flow through the fuel vapor canister and ejector, and into the engine intake via engine vacuum without operating the pump in the absence of boost; and
applying the ejector to a vacuum actuator.

2. The method of claim 1, wherein the vacuum actuator includes a power brake.

3. The method of claim 1, wherein the vacuum actuator includes a wastegate actuator.

4. The method of claim 1, wherein the ejector is positioned downstream of the purge pump.

5. The method of claim 1, wherein pumping a purge flow includes, opening a canister vent valve, closing a vapor bypass valve, and operating the pump.

6. The method of claim 5, further comprising,
pumping an air flow, while bypassing the fuel vapor canister, through the ejector and into the engine intake; and
applying vacuum from the ejector to the vacuum actuator.

7. The method of claim 6, wherein pumping an air flow includes, closing the canister vent valve, opening the vapor bypass valve, and operating the pump.

8. The method of claim 1, wherein pumping a purge flow includes pumping the purge flow through the fuel vapor canister, then through the ejector, and then into the engine intake.

9. An engine method, comprising,
pumping a purge flow through a fuel vapor canister and an ejector, and into an engine intake via a pump when boost is present;
drawing the purge flow through the canister and ejector, and into the intake via engine vacuum without operating the pump;
pumping an air flow, while bypassing the canister, through the ejector and into the intake via the pump; and
applying the ejector to a vacuum actuator.

10. The method of claim 9, wherein the vacuum actuator includes a power brake.

11. The method of claim 9, wherein the vacuum actuator includes a wastegate actuator.

12. The method of claim 9, wherein the ejector is positioned downstream of the pump.

13. The method of claim 9, wherein pumping a purge flow includes, opening a canister vent valve, closing a vapor bypass valve, and operating the pump.

14. The method of claim 13, wherein pumping the air flow includes, closing the canister vent valve, opening the vapor bypass valve, and operating the pump.

15. The method of claim 10, wherein pumping a purge flow includes pumping the purge flow through the fuel vapor canister, then through the ejector, and then into the engine intake.

16. An engine system, comprising,
an engine intake;
a compressor configured to boost intake air;
a fuel vapor canister configured to receive fuel vapors from a fuel tank, the fuel vapor canister communicating with atmosphere via a first canister vent valve and a second vapor bypass valve;
a purge pump;
an ejector coupled downstream of the pump;
a conduit with a plurality of check valves coupled between the ejector and upstream and downstream of the compressor;
a vacuum actuator; and
a controller configured to,
operate the compressor to provide a boost; and
in the presence of boost,
operate the purge pump to pump a purge flow through the fuel vapor canister, through the ejector, into the engine intake, during purging conditions; and
operate the purge pump to pump an air flow bypassing the fuel vapor canister, through the ejector, into the engine intake, during non-purging conditions; and
during purging and non-purging conditions, apply vacuum from the ejector to the vacuum actuator.

17. The system of claim 16, wherein pumping a purge flow includes opening the canister vent valve and closing the vapor bypass valve, and wherein pumping an air flow includes opening the vapor bypass valve and closing the canister vent valve.

18. The system of claim 17, wherein the vacuum actuator is one of a power brake and a wastegate actuator, and wherein the controller is further configured to, in the absence of boost, apply vacuum from the engine intake on the fuel vapor canister and/or ejector.

19. The system of claim 16, wherein pumping a purge flow to the engine intake includes driving at least some purge flow to the engine intake downstream of an intake throttle, and driving at least some purge flow to the engine intake upstream of the compressor.

* * * * *